United States Patent [19]

Todd

[11] 3,794,764

[45] Feb. 26, 1974

[54] TELEPHONE LINE SEIZURE SWITCHES

[76] Inventor: Leonard M. Todd, 424 W. 119th St., New York, N.Y. 10027

[22] Filed: July 5, 1972

[21] Appl. No.: 269,270

Related U.S. Application Data

[63] Continuation-in-part of Ser. No. 88,909, Nov. 12, 1970.

[52] U.S. Cl. .................... 179/2 A, 179/6 E, 179/5 P

[51] Int. Cl. .......................................... H04m 11/00

[58] Field of Search .. 179/2 A, 2 DP, 5 R, 5 P, 6 E, 179/84 R

[56] References Cited

UNITED STATES PATENTS 3,532,822 10/1970 O'Hanlon ........................... 179/2 A

*Primary Examiner*—Ralph D. Blakeslee

[57] ABSTRACT

A telephone line seizure switch employs a dc blocking capacitor and a resistor or transformer or both in series across the telephone line to apply a fraction of ringing voltage to the control element of a transistor or thyristor which then operates a line seizure circuit and operates associated apparatus from a power source. Time delay is shown and bistable switches are taught including a thyristor circuit without a relay.

32 Claims, 11 Drawing Figures

TELEPHONE LINE SEIZURE SWITCHES

This application is a continuation-in-part of pending application Ser. No. 88,909, filed Nov. 12, 1970 for Telephone Answering Devices and is filed, in addition, pursuant to a requirement for division in the parent application. This invention is a further development of U.S. Pat. No. 3,445,600, issued to me.

This invention teaches line seizure switches improving over the prior art, especially by employing only small amounts of available ringing voltage and power by placing a dc blocking capacitor in series with a resistor or a transformer across the telephone line, reactively, to apply a small part of the ring voltage to the control element of a semiconductor such as a transistor or a thyristor which then conducts and actuates a line seizure relay, as one means, and operates associated apparatus, from a power source. Time delay may be included at various points and an SCR may be used to cause line seizure with a resistance in series directly across the line.

It is an object of this invention to provide a line seizure switch which provideS low attenuation of incoming voice signals, which does not require to be switched out of the line, during a telephone answering cycle for example, at least because of its high impedance, which requires extremely small ringing power to operate and does not interfere with telephone service.

It is an object of this invention to provide a line seizure switch which by time delay, may be left connected to the line during manual dialing for example, without actuating the switch.

It is an object of this invention to provide time delay to prevent reactuation of the line seizure switch by the surge which results when line seizure is released, from the rise in voltage from low talking voltage level to high resting line voltage.

It is an object of this invention to employ a thyristor or transistor or other semiconductor to respond to ringing voltage by impressing a small part of such voltage to a junction, or control element of the semiconductor to cause conduction, switching or latching of the semiconductor, employing much smaller amounts of power than taught in the prior art, especially prior art rectifier-relays, and then to actuate relays or solid state switches to establish line seizure and to operate associated apparatus.

It is an object of this invention to eliminate many relays from the line seizure switch through the use of solid state switches, including thyristors, particularly in a dc static switch arrangement and in one circuit to eliminate relays altogether.

It is an object of this invention for the switch to respond to a ring up signal and to establish line seizure without disturbing or interfering with normal telephone operation and to make a small change in line termination impedance which is not readily apparent at the central office.

Figure 4:
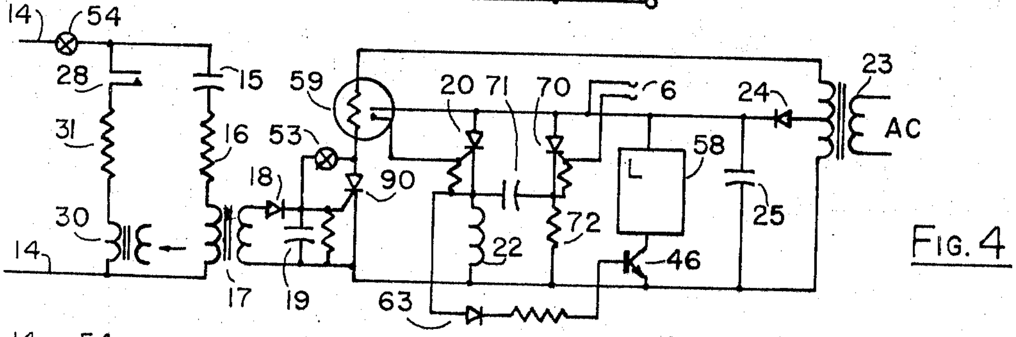

FIG. 4 uses the input circuit to actuate a semiconductor which operates a thermal delay switch, then is coupled to a two thyristor capacity coupled dc static switch.

Figure 5:
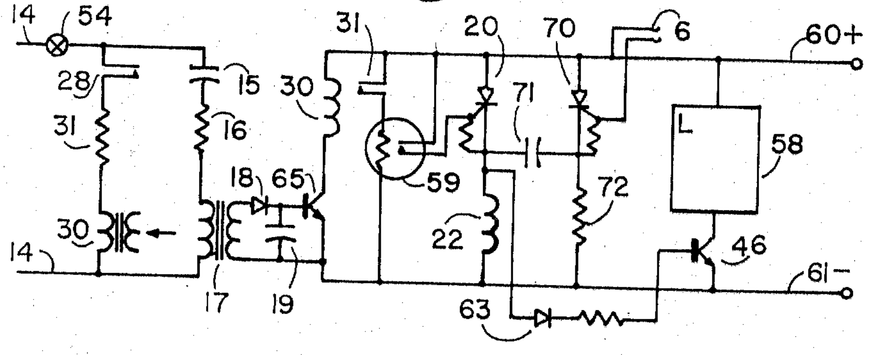

FIG. 5 is the same input circuit coupled to a transistor to operate a relay which operates a thermal delay switch, then is coupled to a two thyristor capacity coupled dc static switch.

Figure 6:
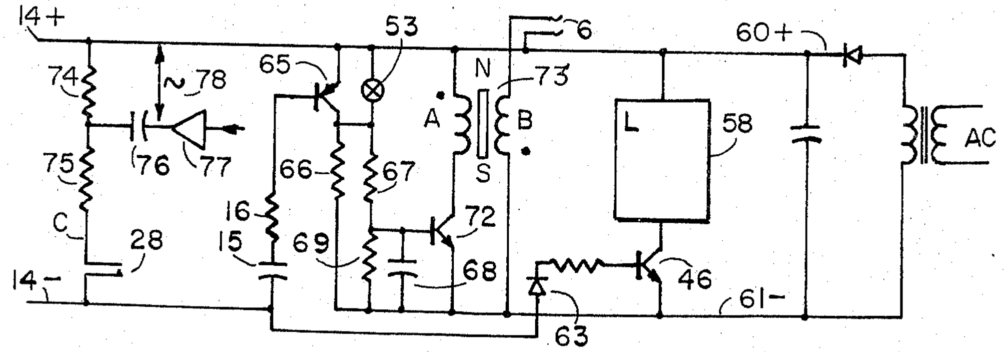

FIG. 6 shows an input circuit capacity coupled to the line actuating a transistor, thence to an R-C circuit, a second transistor operating a bistable permanent magnet relay and a line voltage actuated load.

Figure 7:
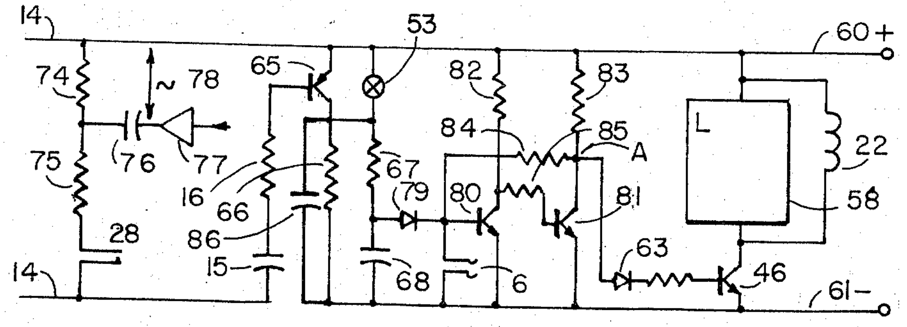

FIG. 7 uses the input circuit of FIG. 6 to actuate a multivibrator.

Figure 8:
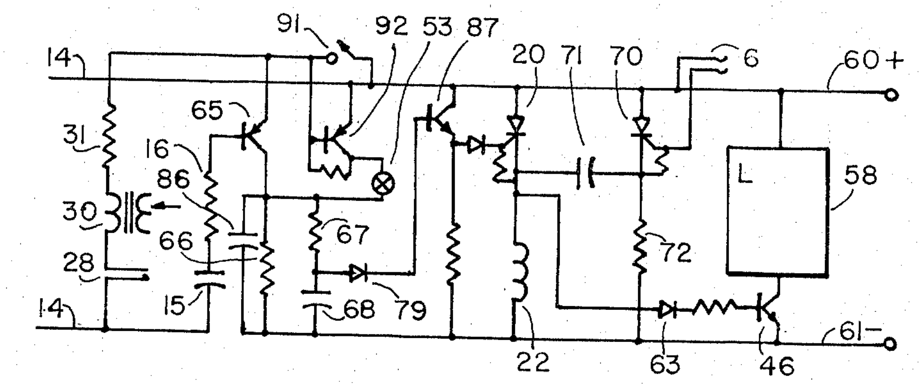

FIG. 8 actuates a dc static switch with the previous circuits.

Figure 9:
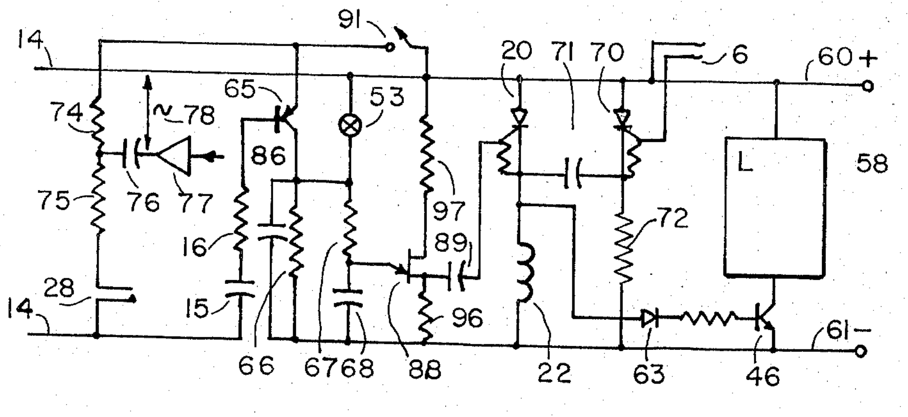

FIG. 9 uses a unijunction transistor capacity coupled to actuate the dc static switch.

Figure 10:
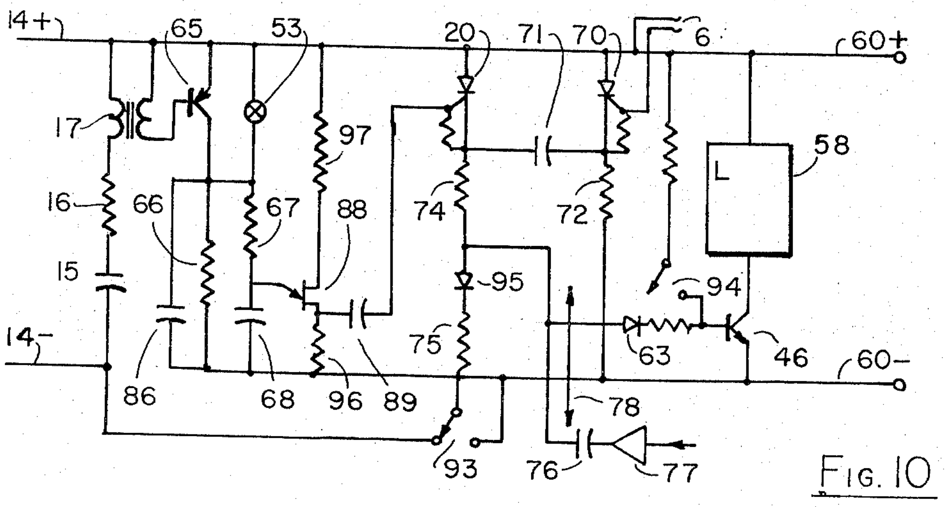

FIG. 10 is a dc static switch or flip-flop in which a thyristor and resistor establish line seizure with no mechanical relay.

Figure 11:
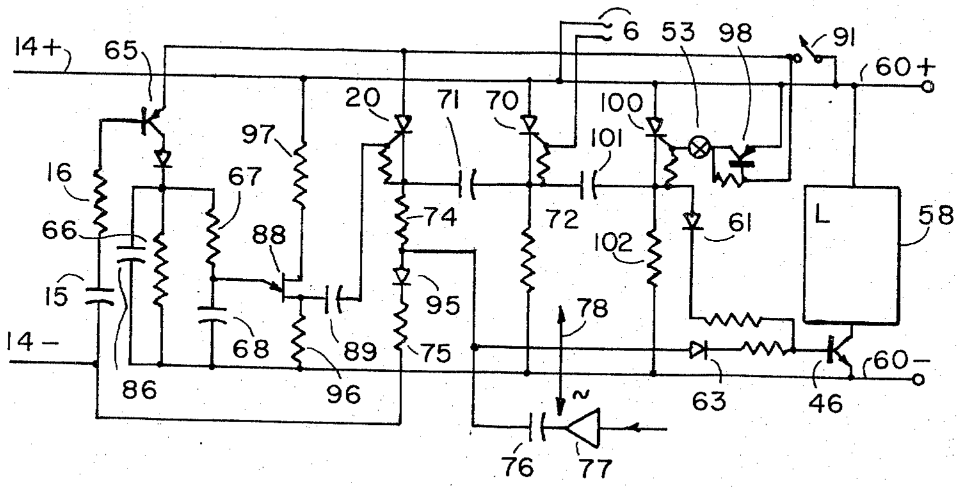

FIG. 11 is similar to FIG. 10 with three thyristors in a tristable arrangement and simplified switching.

This invention teaches the advantages of employing small amounts of available ring signal voltage and power to actuate line seizure switches with the use of solid state switches, not taught in the prior art. A dc blocking capacitor is placed in series with two elements of a three terminal transistor or thyristor, with either or both of a resistor or transformer in the circuit, effectively amplifying a fraction of the ringing voltage to operate a relay, an R-C time delay circuit, a thermal delay switch or the like, or combinations of these, generally operating with about 100 microwatts to base or gate with commercially available semiconductors, lightly loading the line. Solid state devices have the advantage of long life and reliability. Higher sensitivities are possible.

A thyristor is used to establish line seizure without a relay.

A circuit is shown which actuates a load by reference of an intermediate voltage to high line voltage and low talking voltage, to operate a transistor through a diode.

Another circuit applies audio output capacitively to the line seizure circuit.

Figure 1:
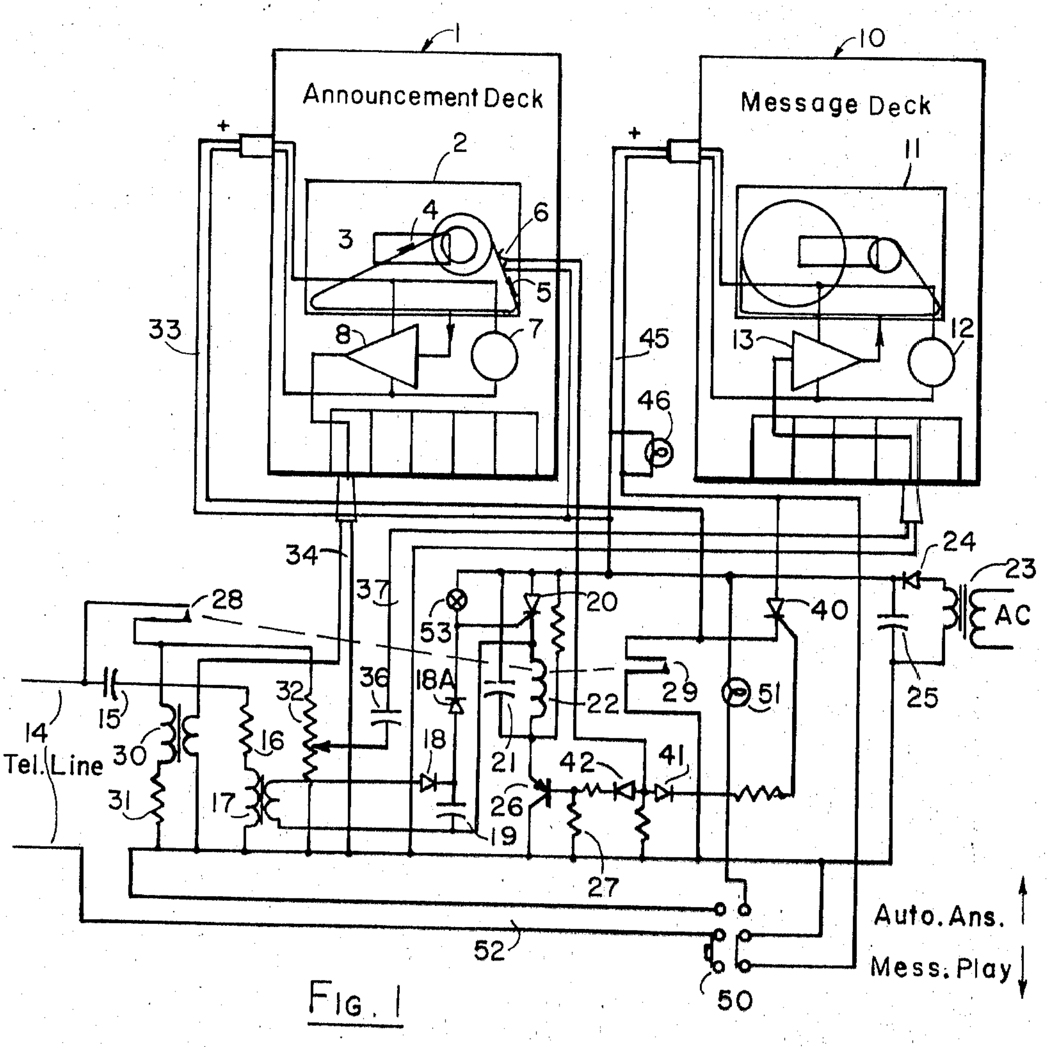
FIG. 1 is a circuit of a telephone answering set using a line seizure switch with a capacitor, resistor and transformer input circuit coupled with two diodes, and a time delay capacitor to a thyristor operating a line seizure relay and commutated by a transistor.

In FIG. 1, the telephone answering set contains announcement deck 1 with endless loop cassette 2, endless tape 3, short length of sensing tape 4, long length of sensing tape 5, sensing tape contacts 6, motor 7 and amplifier 8. As noted in U.S. Pat. No. 3,445,600, other impulse generating elements may be used on the tape with corresponding impulse sensitive transducers in the deck.

Message record deck 10 contains standard reel-to-reel cassette 11, motor 12 and amplifier 13. A ring up signal from telephone line 14 is coupled to the gate of SCR 20 through capacitor 15, resistor 16 and transformer 17, diodes 18, 18A and time delay capacitor 19, causing SCR 20 to latch on with current supplied from transformer 23, diode 24 and capacitor 25. Ringing voltage is in the order of 40 volts ac, is reduced by the high impedance input and transformer 17. When voltage at the gate of SCR 20 reaches about 0.4 volts dc the SCR fires and gate voltage rises to near anode voltage.

Diode 18A prevents charging of capacitor 19 from the gate of SCR 20. This circuit with capacitor 19 does not readily provide a delay of much over 1 ring but serves the important function of preventing SCR 20 from relatching at hang up from the surge of voltage from talking, about 6 volts, to resting, about 50 volts.

Current flows through relay coil 22 and transistor 26, held normally on by resistor 27. Relay contacts 28 and 29 close; line seizure is established through secondary of transformer 30 and resistor 31. Prior to ring up, network 15, 16, 17 together with the low triggering power requirement of the gate of SCR 20, presents a high impedance to the line. This impedance may readily be greatly higher than capacitor, rectifier, relay circuits of the prior art, wherein sensitive relays require a few hundred milliwatts to operate and are usually switched out of the circuit after ring up. An SCR will fire with 100 microwatts or less.

Announcement deck 1 is started with current from power supply through contacts 29 to motor 7 and amplifier 8; amplifier 8 output goes through leads 34 to transformer 30 carrying the announcement to line and to the caller.

An impulse by short sensing tape 4 crossing sensing tape switch 6, to diode 41 and gate of SCR 40, latches this SCR on and starts message deck 10 with current flow from power supply to deck, SCR 40 and contacts 29.

At the conclusion of the message cycle, long sensing tape 5 crosses sensing tape switch 6 sending a long impulse through diode 42 to the base of transistor 26 causing 26 to cease conduction for the duraction of the long impulse. Current then flows from capacitor 21 through SCR 20, relay coil 22 and resistor in parallel. In the time required for the capacitor to discharge, say 0.3 seconds, relay 22 opens releasing contacts 28, releasing line seizure, releasing contacts 29, stopping the recorders and current flow falls below the holding level of SCR 20 causing it to unlatch. The line seizure switch and answering set are now in standby.

Instead of the short and long impulses, a single short impulse from sensing tape switch 6 may be used, without capacitor 21, to commutate SCR 20. Commutation in its simplest form would be by shorting anode to cathode of SCR 20 (transistor 26 not required) by an impulse from sensing tape switch 6 and sensing tape, although this sends much higher current through the tape and switch and is less reliable.

Figure 2:
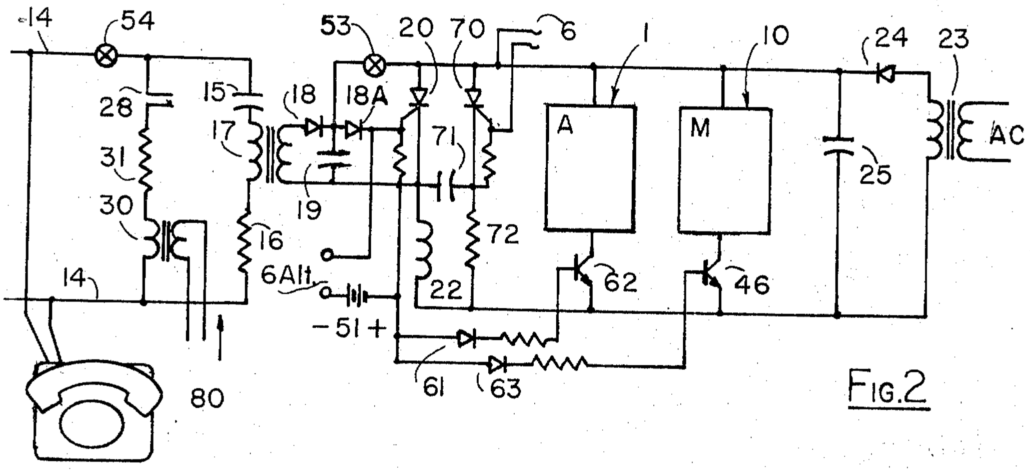
FIG. 2 is a similar circuit for an answering set with a capacity coupled thyristor in a dc switch arrangement; other commutation is shown.

In FIG. 2, SCR 20 is commutated by SCR 70 discharging capacitor 71 across SCR 20. Resistor 72 is selected to provide momentary conduction for SCR 70 causing this to be a dc static switch; a lower value of resistance would cause continuous conduction of SCR 70 when SCR 20 was off, causing this circuit to be a flip-flop. Momentary conduction has several advantages.

With a high resistance relay 22 and low current through relay coil 22, commutation may be had by grounding gate to cathode of SCR 20 by contacts 6 Alternate. Should this be insufficient, negative bias may be added by batteries 51. In this circuit, SCR 70 and capacitor and resistor 71 and 72 are not required. This is a "gate turn off switch" and has more critical design criteria than the flip-flop or dc static switch.

Associated apparatus (A deck 1 and M deck 10 or other equipment) may be operated by additional contacts provided on relay 22, by SCR flip-flops or switches, or the like, or in the preferred form shown, by energizing the bases of transistors 46 and 62 from the cathode of SCR 20, causing these bases to be forward biased and the transistors to conduct current to their respective loads. While the actual circuits for operation of announcement deck 1 and message deck 10 are somewhat more complex, for announcement record and check and message playback, sufficient is shown here to indicate the operation of the line seizure switch. The input circuit responds to a ringing signal in the same manner as for FIG. 1. Momentary contact switch 53 is used to simulate a ring signal, to fire SCR 20, for testing, announcement record and check, etc. Switch 54 or similar circuit is used to remove the line seizure circuit from the line during this operation.

Associated telephone set 80 may be used together with the line seizure circuit, that is, for talking or breaking in during automatic answering. With this particular circuit (also FIGS. 1,3,4 and 3) a relatively short time delay is provided and the signal produced by manual dialing is likely to actuate SCR 20 and cause line seizure, interfering with service. Accordingly, switch 54 is used to remove the line seizure circuit from the line, for manual dialing.

Figure 3:
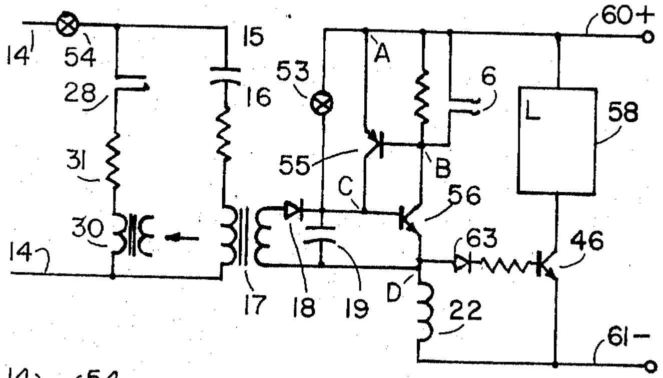
FIG. 3 shows a regenerative feedback pair of NPN-PNP transistors analogous to a thyristor, with a similar input circuit.

A circuit using a regenerative feedback pair of complementary PNP-NPN transistors is shown in FIG. 3, and is closely analagous to an SCR or thyristor. It is noted that many similar circuits employ the principle of regenerative transistors with different component arrangements. A small rectified ring signal of the same order of voltage as is required for an SCR is applied as base - emitter voltage to transistor 56, (points C and D), causing regeneration and driving both transistors into saturation with a consequent low forward voltage drop, causing energization of coil 22, line seizure through contacts 28, and actuation of associated apparatus, load 58, by forward biasing base of transistor 46 from high side of coil 22 through diode 63. Ring signal voltage may be applied to points A and B, base - emitter of transistor 55. Commutation may be obtained by momentarily shorting points A and B through contacts 6 or similarly by shorting points C and D. High sensitivity is possible with this circuit.

In FIG. 4, a longer time delay is provided with thermal delay switch 59 with the disadvantages of higher cost of the delay switch, inability to change the delay period readily and substantially higher power requirements A ring signal applied to the gate of SCR 90 causes it to conduct and actuat delay switch 59. SCR 90 requires no separate commutation since it is supplied with ac from transformer 23. A transistor may be substituted in this circuit with a dc supply and does not require commutation. Ringing may be extended over two or three rings before contacts of 59 close and energize SCR 20. With a delay of this length, the circuit may be left on the line during manual dialing which creates insufficient signal to actuate delay switch 59 and if desired, the line seizure switch may be left in the line indefinitely. Two or three rings is optimum, permitting the customer, at his choice, to answer before the machine establishes line seizure or to allow the machine to answer first.

In the circuit of FIG. 5, relay coil 30 and contacts 31 are actuated transistor 65 when a ring signal is applied to base - emitter of transistor 65. At each ring, contacts 31 close, furnishing power to energize thermal delay switch 59 whose contacts close after a time delay, energizing the gate of SCR 20 as above. Unlatching and release of line seizure occur as for FIG. 2.

In the circuit of FIG. 5, diode 18 and capacitor 19 may be removed and the secondary of transformer 17 connected directly to the base - emitter of transistor 65 with an increase in efficiency.

In FIG. 6, the input circuit comprises capacitor 15, rsistor 16 and base - emitter of transistor 65. While resistor 16 may be lowered in value or removed with smaller values of capacitor 15, criteria become critical. A small fraction of the ring signal voltage in line 14 is required to be applied to base - emitter of transistor 65 (about 1 volt) and the power drawn is in the order of 100 microwatts. With component values chosen adequate to actuate transistor 65, this input circuit will not appreciably attenuate voice signals. When transistor 65 conducts, current flows in R-C charging circuit 66–69 and voltage slowly rises across capacitor 68. The time required to reach a value sufficient to actuate transistor 72 is determined by the selected values of the charging circuit. When the voltage actuates transistor 72, it conducts current through winding A of permanent magnet bistable relay 73 causing the armature to close and remain in that position, closing contacts 28 and establishing line seizure.

In relay 73, windings A and B are of opposite polarity so that a first impulse to one coil causes the armature to latch in one position with no further current required. A second impulse to the second coil causes the armature to return and to latch in the opposite position, again without requiring the further application of current. Similar results may be obtained with a single coil bistable polarized relay with a permanent magnet by applying an impulse to the coil in one direction to latch and an impulse of opposite polarity to unlatch.

At the end of the answering set cycle or termination of function of other apparatus, an impulse given through contacts 6 to winding B of relay 73 causes the armature to open and to remain in that position, releasing line seizure. In the latched condition, additional contacts on the armature may operate associated apparatus or the circuit shown may be used. When contacts 28 of relay 73 close, establishing line seizure, voltage across line 14 drops from resting voltage of about 50 volts to talking voltage of about 6 volts. Power supply voltage, 60+,61− is chosen intermediate between these two voltages, say 10 volts. The differential of +4 volts is adequate to forward bias diode 63 and the base of transistor 46 to cause the transistor to conduct and operate load 58. When line seizure is released, diode 63 is reverse biased and loads the line with current drain in the order of nanoamperes.

Line seizure resistors 74,75 are connected across the line 14 when contacts 28 close, providing a dc path for line seizure. Output 78 of amplifier 77 may be coupled to the line 14 through capacitor 76 at the juncture of resistors 74,75 or at point C; a choice exists for better impedance match. By this circuit, transformer 30 of previous circuits is eliminated, reducing costs. When contacts 28 open, amplifier loading is removed from the line, although with a small value of 76, this may be connected directly to line 14, with relatively light loading. These circuits are useful and not taught for this service in the prior art.

Other well known bistable latching relay circuits may be used, including two winding non-polarized relays, without departing from the spirit of this invention. Reference may be had to "Troubleshooting Reed-relay Logic" by Blacklock, Radio-Electronics, Dec. 1971, pp. 39–42.

The circuit of FIG. 7 uses the input circuit of FIG. 6 with a simple saturated bistable multivibrator (flip-flop). Transistors 80, 81 are coupled by collector resistors 82, 83 and their bases are coupled by resistors 84, 85. When a ring signal creates sufficient potential in capacitor 68 (at about the same level of voltage as in FIG. 6), it traverses diode 79 to reach the base of transistor 80 causing the transistor to turn on, resulting in a low collector to emitter voltage, consequent low base voltage in transistor 81 through resistor 85, turning transistor 81 off. With this low base voltage, the circuit gain is too low for regeneration. With transistor 81 off, the voltage at collector of 81 is high, traversing diode 63 and then actuates transistor 46 to operate load 58 and relay coil 22, closing contacts 28 and establishing line seizure.

At the conclusion of the operating cycle, a shorting impulse to contacts 6 causes transistor 80 to turn off; transistor 81, in similar manner turns on, its output goes low, turning off transistor 46, load 58, opening relay 22, 28, releasing line seizure. Commutation may occur by shorting other points, for example, point A to ground (61−). Common point triggering is less reliable than separate on-off triggering shown.

FIG. 8 is generally similar to the foreging, employing the input circuit of FIG. 6 and the dc static switch of FIG. 2 with transistor 87 functioning to apply the firing impulse to the gate of SCR 20 and also to reduce the loading on the R-C timing circuit. The ring signal causes charging of the R-C circuit, forward biasing transistor 87 after a predetermined period and conduction of current to the gate of SCR 20, causing it to fire. At the conclusion of the operating cycle, an impulse to contacts 6 fires SCR 70 which discharges capacitor 71 across SCR 20, turning 20 off.

Switch 91 connects or disconnects line seizure circuit 74,75,28 and input circuit 15, 16, 65; in the closed condition with line seizure connected, inverter transistor 92 is turned off by shorting base to emitter and switch 53 is disabled. In this condition, accidental actuation of switch 53 will not turn the line seizure circuit on; with switch 91 open and line seizure circuit disconnected, transistor 92 conducts because of resistor from collector to base. Switch 53 is enabled for simulation of a ring signal for test, announcement record or check or the like.

In FIG. 9, the circuit is similar to FIG. 8, with unijunction transistor 88 producing a positive going impulse after ring signal continues for longer than a predetermined time and exceeds peak point voltage; the impulse traverses capacitor 89 and is applied to gate of SCR 20 which fires. While the inverter transistor 92 is not shown, it may readily be included in this or previous circuits.

In FIGS. 10 and 11, line seizure circuits are described in which a thyristor (SCR 20) provides a forward dc line seizure path; when line seizure is released, the off SCR provides a forward voltage blocking circuit for the resting voltage, thus eliminating a line seizure relay and contacts with a consequent reduction in cost and the addition of solid state reliability. SCR 20 may be chosen to have extremely high forward blocking resistance with current flow well under 100 nanoamperes at 50 volts.

FIG. 10 shows SCR's 20 and 70 in a dc static switch, with switches 93 and 94 to provide for normal response to ring signal with the arms of these switches to the left, and turned off for test, announcement check or the like, with the arms to the right. With switch 91 in ring operation position (and switch 94 open), both arms to left, a ring signal received in line 14+, 14− produces a voltage in primary of transformer 17; a secondary voltage is applied to base - emitter of transistor 65 causing conduction and R-C charging as in FIG. 6. When the peak point point voltage of UJT 88 is reached, it fires giving a positive going impulse to SCR 20, which fires, starting the cycle. Current flows from 14+ through anode and cathode of SCR 20, load resistors 74, 75 and diode 95. Audio to the line is applied from capacitor 76 to junction of resistor 74 and diode 95.

This connection places the amplifier impedance with the capacitor across the line, and it is also possible to connect the output of capacitor 76 to the cathode of diode 63 which is reverse biased by resting voltage when line seizure is released. When forward biased by talking voltage less than supply voltage 60+, 60−, it conducts both dc and the audio ac. A slight drawback is the possible introduction of second harmonic distortion by the non-linearity of the voltage-current curve of the diode.

In the line seizure condition, with diode 63 and transistor 46 forward biased, load 58 is operated by current flow from 60+ through 46 to 60−. At the end of an operating cycle, a shorting impulse applied to contacts 6 causes SCR 70 to discharge capacitor 71 and commutate SCR 20. For testing, announcement check and the like, switches 93 and 94 with arms to the right, momentary switch 53 is actuated, simulating a ring signal, SCR 20 fires and an operating cycle starts, operating load 58 as before. At the end of the cycle, an impulse to contacts 6 ends the cycle.

In FIG. 11, the switches 93,94 are simplified to switch 91, a single pole, single throw switch, by the addition of SCR 100, capacitor 101 and resistor 102 in a tristable arrangement. An impulse to the gate of SCR 20 latches this SCR; an impulse to 100 latches this SCR; and an impulse to the gate of SCR 70 unlatches either or both of SCR 20 and SCR 100, whichever is on. A bistable circuit is obtained by capacitive coupling of the gates of SCR 20 and SCR 100, with more critical constants and operation.

With switch 91 closed, ring responsive circuit 15, 16, 65 and line seizure circuit 20, 74, 95, 75 are connected and inverter transistor 98 is deactivated as described for FIG. 8. A ring signal charges R-C circuit and fires UJT 88 after peak point voltage is reached, in the predetermined period, sending an impulse to gate of SCR 20 which fires; load 58 is operated as for FIG. 10. An impulse to contacts 6 terminates the cycle, unlatches SCR 20 which releases line seizure and operating power is removed from load 58 with voltage removed from base of transistor 46.

Opening switch 91 removes ring responsive circuit and line seizure circuit from the line and activates inverter transistor 98, enabling momentary switch 53. Actuation of this switch fires SCR 100 which operates load 58 through diode 61 and transistor 46; since line seizure circuit is disconnected, test, announcement check and the like may be accomplished without interfering with telephone service. Termination of cycle occurs as in the previous paragraph, with an impulse to contacts 6, unlatching SCR 20.

As described for FIG. 10, amplifier output capacitor 76 may be connected to cathode of diode 63, removing the load of the amplifier from line 14 when line seizure is released.

A number of circuits are taught in this invention.

A ring signal is coupled by a capacitor to the base of a transistor or gate of a thyristor from the telephone line causing conduction of the semiconductor, either from a power source or directly across the line to cause line seizure.

Time delay is provided either by a diode and capacitor in the input circuit of the semiconductor coupled to the telephone line or in an amplified R-C circuit with transistor or UJT or thermal delay switch; it is taught that this will prevent hangup surge from reactivating the switch, that it is more convenient to have several rings, and that the line seizure circuit may be left on the line most of the time, including during dialing, except for testing, announcement check and the like.

Several bistable switches are taught including a thyristor latched into conduction and commutated in various ways; a permanent magnet bistable relay operated by a semiconductor, a transistor multivibrator, a regenerative pair thyristor analogue.

The modules and circuits taught may be interchanged and combined in many ways in different circuits; equivalent circuits may be substituted for the modules and immaterial limitations of the circuits and modules omitted, without varying from or departing from the spirit of this invention.

These circuits are adapted for use with telephone answering sets, telephone data transmission terminals, call "diverters" and like telephone apparatus.

Material in this invention appears in Disclosure Document No. 120, filed June 17, 1969.

It should be noted that the transistor analogue of a thyristor in FIG. 3 may be substituted for thyristors generally in these circuits and in FIGS. 10 and 11 as well. It is possible to actuate a unijunction transistor in a time delay circuit from the telephone line, to fire a succeeding thyristor.

Basically, this invention teaches and claims, (a) the turning on of a semiconductor to actuate a relay to establish line seizure and (b) to use a latching semiconductor switch, thyristor or PNP-NPN regenerative pair to cause line seizure directly by conduction in series with an impedance across the telephone line. Time delay is provided either before or after the input semiconductor. Associated apparatus (load 58) is taught to be actuated by a line seizure or other relay, or to be actuated by a series transistor whose base is actuated from a preceding semiconductor load impedance or by change in voltage of the telephone line.

While common emitter transistor circuits are described, especially for ringing voltage input, it is understood that common base and common collector circuits are possible. Where Darlington transistor pairs are required for gain, they are intended to be defined within the word transistor.

In the claims, a semiconductor means a solid state device having PNP, NPN or PNPN structure or a unijunction transistor or similar devices. A thyristor is a semiconductor switch whose action depends on PNPN regenerative feedback, carrying current or blocking current in the forward direction and only blocking current in the reverse direction, usually being a triode having three terminals; its action is shown by an analogous PNP-NPN regenerative transistor pair. Tetrode thyristors have four terminals, the fourth being an additional gate which also may be used to turn the thyristor on. The term "latching semiconductor switch" refers to a thyristor, SCR, PNP-NPN transistor regenerative pair, Dynaquad or like devices, and may include a bistable multivibrator transistor pair; these are considered equivalents in the claims.

The term "commutating means" refers to commutation of thyristors and the like generally, and particularly those methods taught herein including (1) capacity commutation in a flip-flop or dc static switch arrangement, (2) current interruption, for example by cutting off a normally on transistor in series with a thyristor, (3) by shorting the gate to cathode of a thyristor or Dynaquad or applying a negative bias to a thyristor gate as a "gate turn off switch," (4) commutation of a transistor analogue complementary pair by shorting appropriate points of the circuit, (5) capacity commutation of a thyristor by substituting a switch for the commutating thyristor in the flip-flop arrangement, (6) momentary shorting of anode to cathode of a conducting thyristor.

I claim:

1. A ring responsive line seizure switch for a telephone line in which a ringing voltage appears, which may have an associated telephone set and for actuating associated apparatus, comprising a capacitor, a semiconductor having a control element and two current conducting terminals, a power source, said capacitor, said control element and one of said current conducting terminals connected in series reactively across said telephone line, time delay means producing a triggering voltage after actuation for a predetermined time, said power source, said two current conducting terminals and said time delay means connected in circuit, bistable switching means having an unlatched condition and a latched condition, commutating means and a line load impedance, said semiconductor connected to said time delay means, said time delay means connected to said bistable switching means, said bistable switching means connecting said telephone line with said line load impedance and connected to actuate said associated apparatus, said commutating means connected to said bistable switching means, a ringing voltage appearing in said telephone line, a fraction of said ringing voltage being applied to said control element and to said one of said current conducting terminals, causing current flow from said power source through said current conducting terminals to said time delay means, when said ringing voltage continues for said predetermined time, said time delay means producing said triggering voltage, said triggering voltage actuating said bistable switching means into said latched condition, said latched bistable switching means providing a dc path for said telephone line through said line load impedance, establishing line seizure and actuating said associated apparatus; a commutating impulse given to said commutating means causing said latched bistable switching means to return to said unlatched condition, opening said dc path, releasing line seizure and causing said associated apparatus to stop, said switch thereby being restored to standby condition.

2. In claim 1, a transformer having a primary and a secondary, said primary connected in series with said capacitor across said telephone line, said secondary applying said fraction of said ringing voltage to said control element and to said one of said current conducting terminals.

3. In claim 2, a diode and a capacitor in circuit with said secondary, said diode and said capacitor together with said secondary comprising a time delay charging circuit, for input to said control element and said one of said current conducting terminals.

4. In claim 3, commutating means, said semiconductor comprising a pair of complementary NPN-PNP transistors in a regenerative feedback arrangement, each of said transistors having a base, a collector and an emitter, one of said bases corresponding to said control element, said emitters of said transistors corresponding to said current conducting terminals, said fraction of said ringing voltage applied to said diode and said capacitor, charging said capacitor in a time delay arrangement, said capacitor connected effectively to one of said bases and one of said emitters of said transistors causing said complementary pair to latch and current to flow through said complementary pair and said load impedance from said power source, said current flow being employed to establish line seizure and to actuate said associated apparatus, and at the end of an operating cycle, said commutating means causing said complementary pair to unlatch, to release line seizure and to deactuate said associated apparatus.

5. In claim 3, commutating means, said semiconductor comprising a thyristor having a gate, an anode and a cathode, said gate corresponding to said control element, said anode and said cathode corresponding to said current conducting terminals, a second diode, said fraction of said ringing voltage applied to said diode and said capacitor, charging said capacitor, said second diode connected effectively between said capacitor and said gate, said ringing voltage traversing said second diode and going to said gate, said voltage rising after a predetermined period to cause said thyristor to latch and current to flow from said power source through said thyristor and said load impedance, said second diode preventing said capacitor from charging from said gate, said current being employed to establish line seizure and to actuate said associated apparatus, at the end of an operating cycle, said commutating means causing said complementary pair to unlatch, to release and deactuating said associated apparatus.

6. In claim 1, said semiconductor comprising a transistor having a base, a collector and an emitter, said base corresponding to said control element, said collector and said emitter corresponding to said current conducting terminals, said fraction of said ringing voltage applied to said base and said emitter, causing current flow from said power source through said transistor and said impedance.

7. In claim 6, an R-C time delay charging circuit, a bistable switch and commutating means, said collector, said emitter, said impedance and said R-C time delay charging circuit coupled across said power source, said current flow charging said R-C time delay charging circuit and after said ringing voltage continues for more than a predetermined time delay period, latching said bistable switch, said bistable switch in latched condition causing line seizure and actuation of said associated apparatus, and at the end of an operating cycle, said commutating means unlatching said bistable switch, releasing line seizure and deactuating said associated apparatus.

8. In claim 7, a second load impedance, said bistable switch comprising a thyristor having a gate, an anode and a cathode, a unijunction transistor having an emitter and two bases, said second load impedance in series with said thyristor and said power source, said emitter of said unijunction transistor being fed by said R-C charging circuit, said emitter firing after said predetermined time delay period, said unijunction transistor sending a pulse to said gate of said thyristor, causing said thyristor to latch, said latched thyristor causing second current flow from said power source through said second load impedance, said second current flow being employed to establish line seizure and to actuate said associated apparatus, at the end of an operating cycle, said commutating means causing said thyristor to unlatch, to release line seizure and to deactuate said associated apparatus.

9. In claim 7, a second laod impedance, said bistable switch comprising a complementary pair of PNP-NPN transistors in regenerative feedback arrangement, each of said transistors having a base, a collector and an emitter, said emitters being in series with said second load impedance across said power source, one of said bases being effectively connected to said R-C time delay charging circuit, said charging circuit causing said complementary pair to latch after said predetermined time delay period, said complementary pair in latched condition causing second current flow from said power source through said complementary pair and said second load impedance, said second current flow causing line seizure and actuating said associated apparatus, and at the end of an operating cycle, said commutating means unlatching said complementary pair, releasing line seizure and deactuating said associated apparatus.

10. In claim 2, said load impedance comprising a thermal delay switch having output terminals, said fraction of said ringing voltage causing current flow from said power source through said current conducting terminals and said thermal delay switch, said output terminals closing after said ringing voltage is received for more than a predetermined period, causing line seizure and actuating associated apparatus.

11. In claim 2, said semiconductor comprising a transistor having a base, a collector and an emitter, said base corresponding to said control element, said collector and said emitter corresponding to said current conducting terminals, said load impedance comprising a relay, said relay in series with said transistor across said power source, said fraction of said ringing voltage applied to said base and said emitter causing current flow through said transistor, said current flow actuating said relay, said actuated relay causing line seizure and actuating said associated apparatus.

12. In claim 7, a second transistor having a base, a collector and an emitter, said bistable switch comprising a permanent magnet bistable relay having a first and second windings, said second transistor in series with said first winding and said power source, said R-C time delay charging circuit coupled to said base and emitter of said second transistor, said R-C time delay, after said ringing voltage continued for more than a predetermined period, causing second current flow through said second transistor and through said first winding, thereby causing said bistable relay to latch, said latched relay causing line seizure and actuation of said associated apparatus, at the end of an operating cycle, said commutating means applying an impulse to said second winding, unlatching said bistable relay, releasing line seizure and deactuating said associated apparatus.

13. In claim 3, a permanent magnet bistable relay having first and second windings, said semiconductor comprising a transistor having a base, a collector and an emitter, and commutating means, said base corresponding to said control element, said collector and said emitter corresponding to said current conducting terminals, said load impedance comprising said first winding of said relay, said first winding in series with said transistor and said power source, said capacitor coupled to said base and said emitter, said ringing voltage continuing for more than a predetermined time period, charging said capacitor, causing said transistor to conduct and current to flow through said first winding, causing said bistable relay to latch, said latched relay causing line seizure and actuation of said associated apparatus, at the end of an operating cycle, said commutating means applying an impulse to said second winding, unlatching said bistable relay, releasing line seizure and deactuating said associated apparatus.

14. In claim 7, said bistable switch comprising first and second transistors in a bistable multivibrator circuit, each of said transistors having a base, collector and emitter, said R-C time delay charging circuit coupled to said first transistor causing said first transistor to latch after said predetermined time delay period by effectively causing current flow to said base of said first transistor, causing said second transistor to turn off, said multivibrator, with said first transistor on, causing line seizure and actuation of said associated apparatus, at the end of an operating cycle, said commutating means applying an impulse to said multivibrator causing said first transistor to turn off and said second transistor to turn on, said multivibrator with said first transistor off, releasing line seizure and deactuating said associated apparatus.

15. In claim 7, a second load impedance, said bistable switch comprising a thyristor having a gate, an anode and a cathode, a second transistor having a base, a collector and an emitter, said second load impedance in series with said thyristor and said power source, said base of said second transistor being fed by said R-C time delay charging circuit, said second transistor being coupled to said gate of said thyristor, after said predetermined time delay period, said R-C circuit causing said second transistor to conduct sufficient current to said gate to cause said thyristor to latch, said latched thyristor causing second current flow from said power source through said second load impedance, said second current flow being employed to establish line seizure and to actuate said associated apparatus, at the end of an operating cycle, said commutating means unlatching said thyristor, releasing line seizure and deactuating said associated apparatus.

16. In claim 7, a second load impedance, said bistable switch comprising a thyristor having a gate, an anode and a cathode, a unijunction transistor having an emitter and two bases, said second load impedance in series with said anode and cathode of said thyristor across said telephone line, said emitter of said unijunction transistor being fed by said R-C charging circuit, said unijunction transistor being coupled to said gate of said thyristor, said emitter of said unijunction transistor firing after said predetermined time delay period, said unijunction transistor sending a pulse to said gate causing said thyristor to latch, said latched thyristor causing second current flow from said telephone line through said second load impedance providing a dc path for line seizure, said second current flow being employed to actuate said associated apparatus, at the end of an operating cycle, said commutating means unlatching said thyristor, releasing line seizure and deactuating said associated apparatus.

17. In claim 7, a second load impedance, a unijunction transistor having an emitter and two bases, said bistable switch comprising a complementary pair of PNP-NPN transistors in regenerative feedback arrangemen each of said transistors having a base, a collector and an emitter, said second load impedance in series with said emitters of said complementary pair across said telephone line, said emitter of said unijunction transistor being fed by said R-C charging circuit, said unijunction transistor being coupled to one of said bases of said transistors in said complementary pair, said unijunction transistor emitter firing after said predetermined time delay period, said unijunction transistor sending a pulse to said one of said bases of said complementary pair, causing said complementary pair to latch, said latched complementary pair causing second current flow from said telephone line through said second load impedance, providing a dc path for line seizure, said second current flow being employed to actuate said associated apparatus, at the end of an operating cycle, said commutating means causing said complementary pair to unlatch, to release line seizure and to deactuate said associated apparatus.

18. In claim 3, commutating means, said semiconductor comprising a complementary pair of PNP-NPN transistors in regenerative feedback arrangement, each of said transistors having a base, a collector and an emitter, one of said bases corresponding to said control element, said emitters corresponding to said current conducting terminals, said emitters in series with said impedance across said telephone line, said fraction of said ringing voltage applied to said diode and said capacitor, charging said capacitor in a time delay arrangement, said capacitor connected effectively to one of said bases and one of said emiters, after a predetermined time delay period causing said complementary pair to latch and second current flow from said telephone line through said load impedance, providing a dc path for line seizure, said second current flow being employed to actuate said associated apparatus, at the end of an operating cycle, said commutating means causing said complementary pair to unlatch, to release line seizure and to deactuate said associated apparatus.

19. In claim 10, a thyristor having a gate, an anode and a cathode, commutating means, a second load impedance, said anode and cathode of said thyristor in series with said second load impedance across said telephone line, said output terminals effectively connected to said gate and said anode of said thyristor, after said ringing voltage is received for more than said predetermined period, said output terminals closing and causing said thyristor to latch, said latched thyristor causing second current flow from said telephone line through said second load impedance providing a dc path for line seizure, said second current flow being employed to actuate said associated apparatus, at the end of an operating cycle, said commutating means causing said thyristor to unlatch, releasing line seizure, and deactuating said associated apparatus.

20. In claim 3, commutating means, and a second diode, said semiconductor comprising a thyristor having a gate 3, an anode and a cathode, said gate corresponding to said control element, said anode and said cathode corresponding to said current conducting terminals, said anode and cathode in series with said load impedance across said telephone line, said second diode effectively between said capacitor and said gate, said fraction of said ringing voltage applied to said diode and said capacitor charging said capacitor, traversing said second diode and rising after a predetermined period to cause said thyristor to latch and current to flow from said telephone line through said load impedance providing a dc path for line seizure, said current flow being employed to actuate said associated apparatus, at the end of an operating cycle, said commutating means causing said thyristor to unlatch, releasing line seizure and deactuating said associated apparatus.

21. In claim 10, commutating means, a complementary pair of PNP-NPN transistors in regenerative feedback arrangement, each of said transistors having a base, a collector and an emitter, a second load impedance, said emitters of said complementary pair in series with said second load impedance across said telephone line, said output terminals effectively connected to one of said bases of said complementary pair and another available terminal of said complementary pair, after said ringing voltage is received for more than said predetermined period, said output terminals closing and causing said complementary pair to latch, said latched complementary pair causing second current flow from said telephone line through said second load impedance providing a dc path for line seizure, said second current flow being employed to actuate said associated apparatus, at the end of an operating cycle, said commutating means causing said complementary pair to unlatch, to release line seizure and to deactuate said associated apparatus.

22. In claim 16, first and second capacitors, third and fourth load impedances, and second and third thyristors, said thyristor and said second and third thyristors in a tristable arrangement, each of said thyristors having a gate, an anode and a cathode, said second thyristor in series with said third load impedance across said power source, said third thyristor in series with said fourth load impedance across said power source, said first capacitor coupling said first and second thyristors at the juncture of said thyristors and said second and third load impedances, said second capacitor coupling said second and third thyristors at the juncture of said thyristors and said third and fourth load impedances, an impulse to said gate of said third thyristor causing said third thyristor to latch and third current to flow through said fourth load impedance, said third current flow being employed to actuate said associated apparatus for testing when said first thyristor is disconnected from circuit, an impulse to said gate of said second thyristor causing said second thyristor to conduct and to unlatch said first thyristor by discharging said first capacitor across said first thyristor and to unlatch said third thyristor by discharging said second capacitor across said third thyristor.

23. In claim 1, a transistor having a base, collector and an emitter, a diode having an anode and a cathode, said telephone line having a high resting voltage and a low talking voltage, said power source having a voltage intermediate between said resting voltage and said talking voltage, said associated apparatus in series with said collector and emitter across said power source, said anode and cathode of said diode oriented with respect to said telephone line and said base so that said diode is forward biased by said low talking voltage and reverse biased by said high resting voltage, said talking voltage forward biasing said diode and forward biasing said base, causing conduction of said transistor and actuation of said associated apparatus from said power source, said resting voltage reverse biasing said diode, removing current flow from said base, said transistor ceasing to conduct and deactuating said associated apparatus.

24. In claim 1, time delay means, commutating means, a latching semiconductor switch and a second load impedance, said time delay means fed by said semiconductor, said time delay means coupled to said latching semiconductor switch, said latching semiconductor switch in series with said second load impedance across said telephone line, after said ringing voltage continues for more than a predetermined period, said time delay means latching said latching semiconductor switch causing second current flow through said second load impedance from said telephone line providing a dc path for line seizure, said second current flow being employed to actuate said associated apparatus, at the end of an operating cycle, said commutating means unlatching said latching semiconductor switch, releasing line seizure and deactuating said associated apparatus.

25. In claim 5, a transistor having a base, an emitter and a collector, said associated apparatus in series with said emitter and collector across said power source, said base of said transistor being forward biased by said current flow through said load impedance, said transistor then conducting second current flow through, and operating said associated apparatus, when said thyristor is unlatched, said forward bias being removed, said transistor ceasing conduction and deactuating said associated apparatus.

26. In claim 24, a transistor having a base, an emitter and a collector, said associated apparatus in series with said emitter and said collector across said power source, said base of said transistor being forward biased by said current flow through said second load impedance, said transistor then conducting third current flow through, and operating said associated apparatus, when said latching semiconductor switch is unlatched, said forward bias being removed, said transistor ceasing conduction and said associated apparatus being deactuated.

27. In claim 1, said line load impedance comprising a resistor, said bistable switching means including second switching means, an amplifier having an audio output and a ground return, and a second capacitor, said second switching means and said resistor in series across said telephone line to establish and release line seizure, said output and said ground return of said amplifier coupled by said second capacitor to said resistor.

28. A ring responsive line seizure switch for a telephone line in which a ringing voltage appears, comprising a ring detector, time delay means producing a triggering voltage after actuation for a predetermined time period, a latching semiconductor having a control element and two current conducting terminals, said latching semiconductor having a latched condition and an unlatched condition, a relay having a coil and contacts, a power source, a line load impedance and commutating means, said telephone line, said ring detector, said time delay means and said control element connected serially, said current conducting terminals and said coil connected in series across said power source, said commutating means connected to said latching semiconductor, said line load impedance and said contacts in series across said telephone line, a ringing voltage appearing in said telephone line being applied to said ring detector, said ring detector actuating said time delay means, when said ringing voltage continues for said predetermined time period, said time delay means producing said triggering voltage, said triggering voltage applied to said control element causing said latching semiconductor to latch and to cause a first current flow from said power source through said coil, said contacts closing causing a second current flow through said line load impedance, establishing line seizure, a commutating impulse given to said commutating means causing said latching semiconductor to unlatch into said unlatched condition, stopping said first current flow through said coil, said contacts opening, stopping said second current flow and releasing line seizure, said switch thereby being restored to standby.

29. A ring responsive line seizure switch for a telephone line in which a ringing voltage appears comprising a capacitor, a transformer having a primary and a secondary, a diode, a timing capacitor, a latching semiconductor having a control element and two current conducting terminals, said latching semiconductor having a latched condition and an unlatched condition, a relay having a coil and contacts, a power source, a line load impedance and commutating means, said capacitor and said primary connected reactively across said telephone line; said secondary, said diode and said timing capacitor in circuit with said control element with reference to one of said current conducting terminals, said current conducting terminals and said coil in series across said power source, said line load impedance in series with said contacts across said telephone line, said commutating means connected to said latching semiconductor, a ringing voltage appearing in said telephone line, a fraction of said ringing voltage appearing at said secondary and applied to said diode, said diode rectifying said fraction of said ringing voltage and charging said timing capacitor, when said ringing voltage continues for said predetermined time, said voltage across said timing capacitor reaching said triggering voltage and being applied to said control element, causing said latching semiconductor to latch and current to flow through said coil, said contacts closing and providing a dc path from said telephone line through said line load impedance, establishing line seizure, a commutating impulse given to said commutating means causing said latched semiconductor to unlatch into said unlatched condition, stopping current flow through said coil, said contacts opening said dc path and releasing line seizure, said switch thereby being restored to standby.

30. A ring responsive line seizure switch for a telephone line in which a ringing voltage appears comprising a first and a second thyristor, each of said thyristors having a gate, an anode and a cathode, a line load impedance, a second load impedance, a capacitor, a power source, means to couple said telephone line to said gate of said first thyristor, said anode and said cathode of said first thyristor and said line load impedance in series across said telephone line, said anode and said cathode of said second thyristor in series with said second load impedance across said power source, said first and second thyristors coupled by said capacitor in a d.c. static switch arrangement, a ringing voltage appearing in said telephone line, a triggering voltage being applied by said means to couple said telephone line to said gate of said first thyristor, to said gate of said first thyristor, causing said first thyristor to latch and a first current to flow through said line load impedance and to establish line seizure, a commutating impulse given to said gate of said second thyristor causing said second thyristor to latch and to discharge said capacitor through said second thyristor across said first thyristor, causing said first thyristor to unlatch, releasing line seizure, said switch being restored to standby, said second thyristor then restoring to unlatched condition.

31. In claim 30, said first and second thyristors coupled by said capacitor in a flip flop arrangement.

32. A ring responsive line seizure switch for a telephone line in which a ringing voltage appears and which may have an associated telephone set and for actuating associated apparatus comprising a ring detector, time delay means producing a triggering voltage after actuation for a predetermined time period, first, second and third thyristors, each of said thyristors having a gate, an anode and a cathode, a line load impedance, first and second capacitors, a second and a third load impedance, a power source, said telephone line, said ring detector, said time delay means and said gate of said first thyristor coupled serially, said anode and said cathode of said first thyristor and said line load impedance in series across said telephone line, said anode and said cathode of said seocnd thyristor in series with said second load impedance across said power source, said anode and said cathode of said third thyristor in series with said third load impedance across said power source, said first capacitor coupling said first thyristor to said second thyristor, said second capacitor coupling said second thyristor to said third thyristor, said three thyristors thereby coupled in a tristable arrangement, a ringing voltage appearing in said telephone line being applied to said ring detector, said ring detector actuating said time delay means, said ringing voltage continuing for said predetermined time, said time delay means producing said triggering voltage, said triggering voltage applied to said gate causing said first thyristor to latch and to cause a first current flow from said telephone line through said line load impedance, establishing line seizure, said first current flow which may be used for actuating said associated apparatus, a commutating impulse given to said gate of said second thyristor causing said second thyristor to latch and said first capacitor to be discharged across said first thyristor causing said first thyristor to unlatch; an actuating impulse given to said gate of said third thyristor causing said third thyristor to latch and a second current to flow from said power source through said third load impedance, said second current flow which may be employed to actuate said associated apparatus, a commutating impulse given to said gate of said second thyristor causing said second thyristor to latch and said second capacitor to be discharged across said third thyristor, causing said third thyristor to unlatch, said second current flow to stop and said associated apparatus to be deactuated.

* * * * *